Patented Feb. 12, 1935

1,990,966

UNITED STATES PATENT OFFICE 1,990,966

INSECTICIDAL DUST AND PROCESS OF APPLYING LIQUID INSECTICIDE

William Hunter Volck, Watsonville, Calif., assignor to California Spray-Chemical Corporation, San Francisco, Calif., a corporation of Delaware No Drawing. Application June 29, 1931, Serial No. 547,787

29 Claims. (Cl. 167—28)

My invention relates to the uses and applications of a new insecticidal dust and consists in a new process of applying liquid insecticide, and of a product adapted thereto.

It is often desirable, whether because of scarcity of water or the distribution desired, or for other reasons, to use various insecticides in the form of a dust or dry powder which may be applied by means of dust blowers, hand throwing, or one of the various other well known and convenient means of applying dust insecticides.

Certain liquid parasiticides and insecticides and particularly oils (referring especially to various mineral oils which are now so generally used as emulsions and as other forms of liquid sprays) are among the best contact parasiticides and insecticides. Up to the present time, however, no material success has been attained in this application with a dry of dusty carrier.

The principal difficulty encountered in preparing an oil or other liquid dust is the fact that, if any considerable percentage of oil is used, it renders the carrier dust wet, sticky, easily compacted, and unmanageable as a dust to be applied by a blower or other device. If, on the other hand, the percentage of oil or other liquid is so reduced as to leave the dust carrier still in a powdery and dustable condition, then the liquid is so firmly retained by the carrier that it will not wet or grease the bodies of insects with which it may come in contact and the powder may be blown or washed away before having any useful effect. Since, for example, the actual greasing of the insect body is essential for any insecticidal effect with a non-volatile oil, such dry oil dusts have little or no value.

I have discovered that this difficulty may be overcome by using and combining with the oil minute particles of a transient carrier, i. e. one which serves as a carrier for the time being only. This I may do by causing the dust carrier to become oleophobic, e. g. to take up moisture and repel the oil, to sublime and leave the oil, to dissolve and expel the oil to its surface and thus in one of several ways to deposit it on the insect, the plant, etc. I thus in some way remove a large part of the dust carrier from the oil, after the dust has been applied, and leave the oil free to contact with the insect bodies. Such carriers I describe as transient dust carriers.

In order to accomplish this removal of the dust carriers, and thereby free the oil, I may for example use a water soluble but dry and powdered material and incorporate with it enough liquid to render it only partially adherent, e. g. as much oil as it will absorb without becoming too wet to act as a dust. Obviously, the proper proportion of liquid by weight depends on the density of the liquid and of the carrier material, the latter's fineness of ultimate division, the surface properties of the dust and the liquid, etc., but that is easily determinable by observation of the behavior of a mixture of the particular materials. In practice I find that it requires about (i. e. of the general order of) ten parts by weight of minute dry dust particles to make the particles carry the liquid without becoming sticky in the sense above indicated, when neither has a specific gravity far removed from one. Powdered sugar, for example, is an excellent material of this class. One example of such a mixture or composition of matter is powdered sugar 220 parts by weight, and a suitable oil 20 parts by weight.

Also I may replace a proportion of the sugar or other transient carrier dust with other dust material, which supplementary dust particles may be either beneficial to the plant, or actively poisonous to the insect, or both. The following is an example of such a mixture and a description of the applications of the same, for example, to pineapples, and a record of the results obtained:

| | Parts |
|---|---|
| Powdered sugar | 200 |
| Liquid stock, H | 20 |
| Iron phosphate | 20 |
| Copper carbonate | 2 |
| | 242 |

The H stock of this example is one of the well purified viscous hydrocarbon oils having a Saybolt viscosity of about 100 or 110 at 100° F. and practically free from unsaturated components, sulfur or other phytocidal impurities. The iron phosphate and copper carbonate are not, as above indicated, essential to the composition of the dust, but the former is added to supply iron to the pineapple plants and the latter serves to make a stomach poison of the mixture in case insects attempt to feed on the syrup. It will be noted that their higher specific gravity makes it desirable to use slightly greater total weight of powder. Other finely divided insecticides or parasiticides may be used, either as part of the transient carrier dusts if they are strongly hydrophile or else to remain attached with the oil if they are oleophile.

This material was applied to marked pineapple plants infested with mealy bugs. The plants selected for test were visibly infested. Part of the material was applied with a regular duster and part was hand-thrown. This material dusted rather well. Many mealy bugs showed a coating of the dust. Inspection next day showed that there had been a remarkable slaughter of mealy bugs. The atmospheric moisture had been only sufficient partially to dissolve the sugar, but the mealy bugs were practically oil soaked. Inspection two days later showed most of the surplus sugar dissolved from the exposed leaves and the oil lodged in the leaf cups. The crown leaves, where folded together, retained much of the material in the form of a syrup coated with oil. The kill of mealy bugs was very high on the hand-thrown plants, and excellent on the ones treated by the duster. The following day, after a hard-shower, oily material was still present in the crown and leaf cups, the kill of mealy bugs still looked good and there were no ants on the treated plants. On pulling out one of the crown leaves, well coated with the deposit, and tasting it, there was no noticeable sweet taste remaining. It was evident that the sugar had disappeared, but the oil and the iron phosphate precipitate were markedly in evidence.

While powdered cane sugar is an example of material suitable for use as a transient dust carrier, e. g. a soluble filler, it is obvious that a number of other materials may be used, such as dextrine or corn sugar. Hygroscopic substances may be used to initiate and hasten the action of natural humidity in rendering the powder oleophobic. Sugar-cane molasses may be thoroughly dried, as by spray drying, and reduced to a fine powder and possesses advantages both from the standpoint of its cost and its deliquescent or hygroscopic character. Plant food material, which at least the pineapple plant is capable of absorbing directly, may be used as itself a dust carrier, or partially replace the carrier dust. It is, in a sense, also transient, being taken up and removed by the plant.

Sulfite waste liquor is another possible carrier. Water soluble inorganic salts are largely, if not entirely, ruled out because of the injury which would generally result from use in such a concentrated form.

A dust that controls pineapple insects including the mealy bug (Pseudococus brevipes) and the thrips fills a long-felt want with the Hawaiian pineapple grower. The pineapple fields are dry and water for liquid spraying must be hauled long distances. Also the method of planting and the lay of the land makes the use of power sprayers very difficult and expensive. Dusting is a much easier procedure. It can either be done with light mechanical equipment or hand-thrown into the plant crowns; as is the usual practice now with tobacco dust. This procedure is quite rapid and inexpensive.

While the oil dust mixtures above described are especially adapted for use on pineapples, they may also be even more generally useful on certain field crops, flowers, and possibly orchard work as well. While I recognize that, in certain locations and for certain purposes, the cost of sugar would be prohibitive, there are likewise locations in which the sugar is cheap and the value of the plants and fruit to be protected is vastly greater than the cost of the sugar as a carrier of protective material.

As above indicated, there are already available a number of cheaper materials. Sulfite-pulp liquor and several other industrial wastes, when properly treated, can be made available for this purpose. Likewise, novel methods of manufacture may be expected to develop synthetic materials which will be available for this purpose at very low cost. Some of these materials need not rely on the atmospheric moisture to render them evanescent carriers. Instead of washing away, or dissolving themselves in hydroscopic water, these materials sublime and pass off as vapor, leaving the oil as well as the accompanying plant nutrient or tonic and the accompanying insecticide, if any, free to act in their desired capacities.

While I have described several specific forms of my invention, therefore, I do not wish to be limited thereto, as the invention clearly involves the application of a liquid parasiticide or insecticide, with or without accompanying nutrients, tonics or insecticides, in the form of a dry or apparently dry dusting powder consisting of or comprising a novel composition of matter. This may be broadly described as comprising the liquid with an excess of finely divided transient carrier dust. The evanescence of this dust is relative to the insecticide liquid, so that when the liquid is oily in character a large part of the dust is potentially oleophobic and prefers to leave the oil, thus liberating it for its active insecticidal work. In most climates one form of oleophobic dust may be described as hydrophile, in the sense that it takes up water, thereby dissociating the composition into free oil and wet dust which no longer retains its oil holding power. The dust may, however, either vaporize, dissolve, or otherwise become separated from the oil, thereby causing its carrier action to be limited in time and merely transient, and complete separation is not necessary to secure effective action so that a considerable part of the carrier dust may consist of supplementary particles of plant food, plant tonics or insect stomach poisons.

What I desire to secure by Letters Patent and therefore claim is:

1. A new composition of matter; a dusting parasiticide comprising a solid transient carrier of fine dust and a water insoluble parasiticidal liquid.

2. A new composition of matter; a dusting parasiticide comprising a solid transient carrier of fine dust and a water insoluble parasiticidal liquid roughly about one-tenth the dry weight of solid particles between which it is carried.

3. A new article of manufacture composed of parasiticidal dust material that comprises within itself a transient carrier in the form of minute solid particles rendered only partially adherent by a water insoluble liquid parasiticide.

4. A new article of manufacture composed of parasiticidal dusting material that comprises within itself minute particles of a potentially oleophobic solid rendered only partially adherent by a parasiticidal oil.

5. A new article of manufacture composed of parasiticidal dusting material that comprises within itself minute particles of a hydrophilic solid rendered only partially adherent by a parasiticidal oil.

6. A new composition of matter; a dusting insecticide comprising a solid transient carrier of fine dust and a water insoluble insecticidal liquid.

7. A new composition of matter; a dusting insecticide comprising a solid transient carrier of fine dust and a water insoluble insecticidal liquid roughly about one tenth the dry weight of solid particles between which it is carried.

8. A new article of manufacture composed of insecticidal dust material that comprises within itself a transient carrier in the form of minute solid particles rendered only partially adherent by a water insoluble liquid insecticide.

9. A new article of manufacture composed of insecticidal dusting material that comprises within itself minute particles of a potentially oleophobic solid rendered only partially adherent by an insecticidal oil.

10. A new article of manufacture composed of insecticidal dusting material that comprises within itself minute particles of a hydrophilic solid rendered only partially adherent by an insecticidal oil.

11. A new composition of matter; a dusting parasiticide comprising a solid transient carrier of fine dust and a water insoluble parasiticidal liquid and further characterized by comprising also supplementary particles.

12. A new composition of matter; a dusting parasiticide comprising a solid transient carrier of fine dust and a water insoluble parasiticidal liquid roughly about one-tenth the dry weight of solid particles between which it is carried and further characterized by comprising also supplementary particles.

13. A new article of manufacture composed of parasiticidal dust material that comprises within itself a transient carrier in the form of minute solid particles rendered only partially adherent by a water insoluble liquid parasiticide and further characterized by comprising also supplementary particles.

14. A new article of manufacture composed of parasiticidal dusting material that comprises within itself minute particles of a potentially oleophobic solid rendered only partially adherent by a parasiticidal oil and further characterized by comprising also supplementary particles.

15. A new article of manufacture composed of parasiticidal dusting material that comprises within itself minute particles of a hydrophilic solid rendered only partially adherent by a parasiticidal oil and further characterized by comprising also supplementary particles.

16. The method of applying water insoluble parasiticidal liquid to infested plants which consists in embracing the liquid in about ten times its weight of dust comprising a finely divided transient solid carrier and then dusting the resultant powdery material upon the plant.

17. The method of applying parasiticidal oil to infested plants which consists in embracing the oil in about ten times its weight of a finely divided and potentially oleophobic solid and then dusting the resultant powdery material upon the plant.

18. The method of applying parasiticidal oil to infested plants which consists in embracing the oil in a finely divided hydrophilic solid and then dusting the resultant powdery material upon the plant.

19. The method of applying water insoluble parasiticidal liquid to infested plants which consists in embracing the liquid in about ten times its weight of dust comprising a finely divided transient solid carrier and then dusting the resultant powdery material upon the plant and further characterized by comprising also supplementary particles.

20. The method of applying parasiticidal oil to infested plants which consists in embracing the oil in about ten times its weight of a finely divided and potentially oleophobic solid and then dusting the resultant powdery material upon the plant and further characterized by comprising also supplementary particles.

21. A new composition of matter; a dusting parasiticide comprising fine dust of dried sulfite waste liquor and a water insoluble parasiticidal liquid.

22. A new composition of matter; a dusting parasiticide comprising fine dust of dried molasses and a water insoluble parasiticidal liquid.

23. A new composition of matter; a dusting parasiticide comprising fine dust of dried cane sugar and a water insoluble parasiticidal liquid.

24. A new composition of matter; a dusting insecticide comprising fine dust of dried sulfite waste liquor and a water insoluble insecticidal liquid.

25. A new composition of matter; a dusting insecticide comprising fine dust of dried molasses and a water insoluble insecticidal liquid.

26. A new composition of matter; a dusting insecticide comprising fine dust of dried cane sugar and a water insoluble insecticidal liquid.

27. The method of applying parasiticidal oil to infested plants which consists in embracing the oil in finely divided dried sulfite waste liquor and then dusting the resultant powdery material upon the plant.

28. The method of applying parasiticidal oil to infested plants which consists in embracing the oil in finely divided dried molasses and then dusting the resultant powdery material upon the plant.

29. The method of applying parasiticidal oil to infested plants which consists in embracing the oil in finely divided dried cane sugar and then dusting the resultant powdery material upon the plant.

WILLIAM HUNTER VOLCK.